United States Patent
Sumi et al.

(10) Patent No.: US 6,641,226 B2
(45) Date of Patent: Nov. 4, 2003

(54) WHEEL COVER

(75) Inventors: Isao Sumi, Aichi (JP); Eiji Saito, Aichi (JP); Takashi Yamada, Aichi (JP); Keiichi Kitayama, Aichi (JP); Yasuhide Narita, Aichi (JP)

(73) Assignee: Kabushiki Kaisha Tokai Rika Denki Seisakusho, Aichi (JP)

(*) Notice: Subject to any disclaimer, the term of this patent is extended or adjusted under 35 U.S.C. 154(b) by 0 days.

(21) Appl. No.: 10/200,999

(22) Filed: Jul. 24, 2002

(65) Prior Publication Data
US 2003/0034688 A1 Feb. 20, 2003

(30) Foreign Application Priority Data

Aug. 10, 2001 (JP) ........................................ 2001-244031

(51) Int. Cl.$^7$ .............................. B60B 7/12; B60B 7/00
(52) U.S. Cl. ............................. 301/37.33; 301/37.32; 301/37.34; 301/37.42
(58) Field of Search ................ 301/37.101, 37.102, 301/37.31, 37.32, 37.33, 37.34, 37.39, 37.42, 37.12

(56) References Cited

U.S. PATENT DOCUMENTS

| | | | | | |
|---|---|---|---|---|---|
| 2,903,300 | A | * | 9/1959 | Hurd | 301/37.12 |
| 4,709,967 | A | * | 12/1987 | Sakamoto | 301/37.42 |
| 4,826,253 | A | * | 5/1989 | Shirai et al. | 301/37.36 |
| 4,995,674 | A | * | 2/1991 | Shirai et al. | 301/37.36 |
| 5,161,860 | A | * | 11/1992 | Sakane | 301/37.42 |
| 6,099,082 | A | * | 8/2000 | Wang | 301/37.33 |
| 6,139,114 | A | * | 10/2000 | Wang | 301/37.33 |
| 6,371,570 | B1 | * | 4/2002 | Wang | 301/37.33 |
| 6,425,640 | B1 | * | 7/2002 | Hussaini | 301/37.33 |

* cited by examiner

Primary Examiner—S. Joseph Morano
Assistant Examiner—Jason R. Bellinger
(74) Attorney, Agent, or Firm—Morgan, Lewis & Bockius LLP

(57) ABSTRACT

The contact area between the wheel cover and an engaged part of a disc wheel is increased by providing a projecting part (21) on an outer surface (18a1) of a bulge part (18a), which is an engaging surface of a mounting claw (18) to be engaged with the annular engaged part of the disc wheel and used for mounting a wheel cover. Further, the friction therebetween is increased. Thus, an operation of hindering rotation of the wheel cover is achieved without forming a rib on the wheel cover and without forming a stopper on the disc wheel.

4 Claims, 9 Drawing Sheets

CONVENTIONAL ART

WHEEL COVER

BACKGROUND OF THE INVENTION

The present invention relates to a wheel cover whose whirl-stop structure is improved.

A wheel cover shown in FIG. 13 has been ordinarily used as a wheel cover for use in a vehicle, for example, an automobile. This wheel cover 1 has a cover body 2 made of a synthetic resin. A plurality of mounting claws 3 and a plurality of ring supporters 4 are provided on a rear-surface-side peripheral part of this cover body 2 in such a way as to be integral therewith. A wire ring 5 formed like an endless ring from a metallic wire is moved forward from the rear side of the cover body 2. Then, the wire ring 5 is inserted into between the mounting claws 3 and the ring supporters 4 and provided on a portion located inwardly in the radial direction of the mounting claws 3.

On the other hand, in a disc wheel 6 of the automobile shown in FIG. 14, a concave portion 8 serving as an annular engaged part is formed in a rim 7. When the wheel cover is attached to the disc wheel, the wheel cover 1 is engaged with the concave portion 8 by pushing the mounting claws 3 into the concave portion 8. At that time, the wire ring 5 restrains the mounting claws 3 from deforming radially and inwardly, that is, in a direction in which the mounting claws 3 are disengaged. Consequently, the mounting claws 3 are firmly engaged with the concave portion 8 of the rim 7. Thus, the wheel cover 1 is attached to the disc wheel 6. The cover body 2 covers an outer surface part of the disc wheel 6. Incidentally, in FIG. 14, reference numeral 9 designates a tire attached to the disc wheel 6.

Regarding a whirl-stop for the wheel cover 1, a suitable rib (not shown) is formed on the wheel cover 1. A stopper is formed on the rim 7 of the disc wheel 6. The rib formed on the wheel cover 1 is stopped by this stopper by being latched thereon in the direction of rotation of the wheel cover 1. Consequently, the rotation of the wheel cover 1 is prevented.

However, according to a whirl-stop structure of the conventional wheel cover 1, the cost of the disc wheel 6 is high owing to the stopper formed on the rim 7 of the disc wheel 6.

Further, a die for forming the wheel cover 1 is complex owing to the rib formed on the wheel cover 1. Thus, the cost of the wheel cover 1 becomes high.

Moreover, because of such a stopper, which is formed on the rim 7 of the disc wheel 6, and such a rib formed on the wheel cover 1, the mass distribution thereof is uneven. Thus, the rotational balance of a rotating element composed of the disc wheel 6, the tire 9, and the wheel cover 1 is deteriorated.

SUMMARY OF THE INVENTION

The invention is accomplished in view of the aforementioned circumstances. Accordingly, an object of the invention is to provide a wheel cover enabled to perform a necessary whirl-stop operation without increasing the cost thereof and deteriorating the rotational balance.

To achieve the foregoing object, according to the invention, there is provided a wheel cover (hereunder referred to as a first wheel cover of the invention) that comprises a synthetic resin cover body disposed on a vehicle disc wheel, which has an annular engaged part, in such a way as to cover an outer surface part thereof, mounting claws, each of which is provided on a rear surface of this cover body in such a manner as to be integral therewith and engaged with an engaged part of the disc wheel, for mounting the cover body onto the disc wheel, a wire ring, which is located inwardly in the radial direction of the mounting claws, for restraining the mounting claws from deforming radially and inwardly, and a projecting part provided on an engaging surface of the mounting claw in such a way as to project therefrom toward the engaged part of the disc wheel and as to be integral with the mounting claw.

According to the first wheel cover of the invention, the contact area between the wheel cover and the engaged part of the disc wheel is increased by the projecting part provided on the engaging surface of each of the mounting claws. Moreover, the friction therebetween is increased. Thus, an operation of hindering rotation of the wheel cover can be performed without forming a rib on the wheel cover and without forming a stopper on the disc wheel.

In this case, according to an embodiment (hereunder referred to as a second wheel cover of the invention) of the first wheel cover of the invention, preferably, the projecting part is provided on the central part of the engaging surface of each of the mounting claws, and constituted by a projection to be press-crushed by engaging the mounting claws with the engaged part of the disc wheel.

According to the second wheel cover of the invention, the contact area between the engaged part of the disc wheel and each of the mounting claws is increased by press-collapsing the projection. Thus, the friction therebetween is increased.

Further, according to an embodiment (hereunder referred to as a third wheel cover of the invention) of the first wheel cover of the invention, the projecting part may be constituted by an uplift part provided on the engaging surface of each of the mounting claws so that the projecting height of the central portion thereof is more than the projecting height of each of both side end portions thereof.

According to the third wheel cover of the invention, the contact area between the engaged part of the disc wheel and each of the mounting claws is increased by the entire surface of the uplift part.

DETAILED DESCRIPTION OF PREFERRED EMBODIMENTS

First Embodiment

Hereinafter, a first embodiment of the invention is described hereinbelow with reference to FIGS. 1 to 6.

Figure 3:
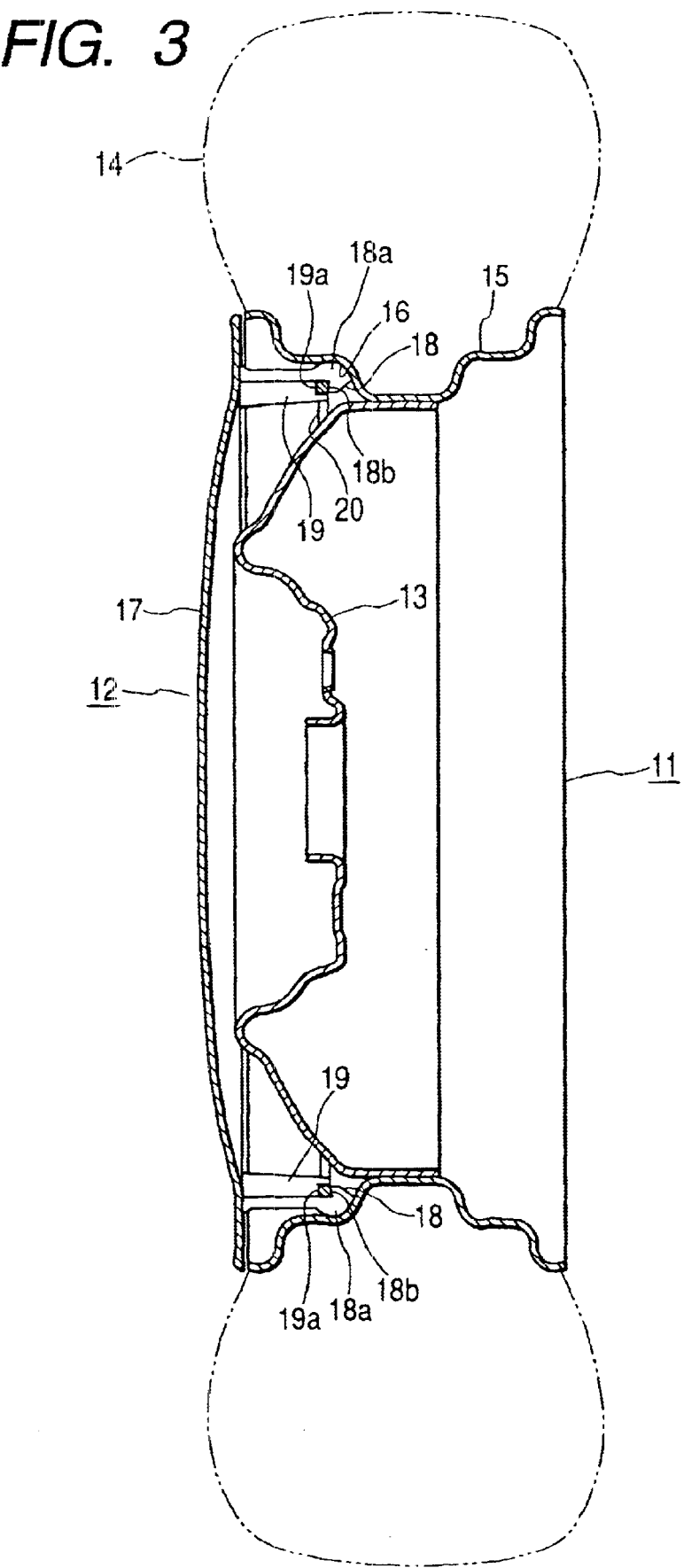
FIG. 3 is a longitudinally sectional view illustrating a wheel cover and a disc wheel, to which the wheel cover is attached.
Figure 4:
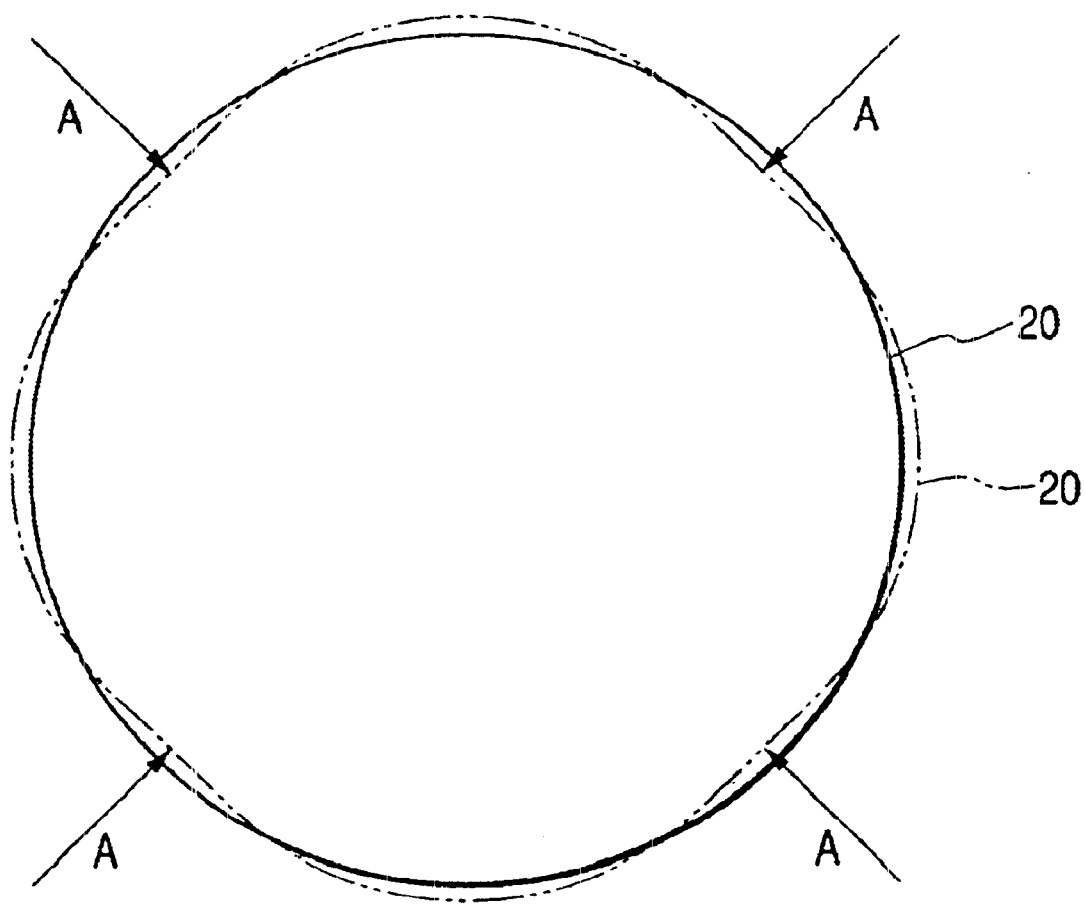
FIG. 4 is a side view illustrating a modification state of a wire ring so as to describe an operation of the first embodiment.

Referring first to FIG. 3, there is shown a vehicle, especially, a disc wheel 11 and a wheel cover 12 attached thereto of an automobile. The disc wheel 11 is constructed by integrally forming a disc 13 attached to a hub (not shown) of the automobile, and a rim 15 to which a tire is attached. The rim 15 has a concave part 16, which serves as an annular engaged part, in an inner surface part on a side opposite to a side to which the tire 14 is attached.

On the other hand, the wheel cover 12 includes a cover body 17, mounting claws 18, ring supporters 19, and a wire ring 20. Among these elements, in this case, the cover body 17 is formed like a disc, which swells a little at a front side (that is, the left side, as viewed in FIG. 3) thereof, from a synthetic resin.

All the plural mounting claws 18 and the plural ring supporters 19 are provided on a rear-side peripheral part in such a way as to be integral with the cover body 17. The ring supporters 19 are located inwardly in the radial direction of the mounting claws 18. Each of the mounting claws 18 includes a bulge part 18a located outwardly in the radial direction of an end part thereof, and a step-like part 18b located inwardly in the radial direction. Each of the ring supporters 19 includes a step-like part 19a located outwardly in the radial direction of the end part.

The wire ring 20 is formed like an endless ring by rolling up a metallic wire and then welding opposite ends of the metallic wire to each other. This wire ring is moved forward from the rear side of the cover body 17. Then, the wire ring 20 is inserted into between the step-like part 18b of each of the mounting claws 18 and the step-like part 19a of a corresponding one of the ring supporters 19 and thus provided on a portion located inwardly in the radial direction of the mounting claws 18.

Figure 1:
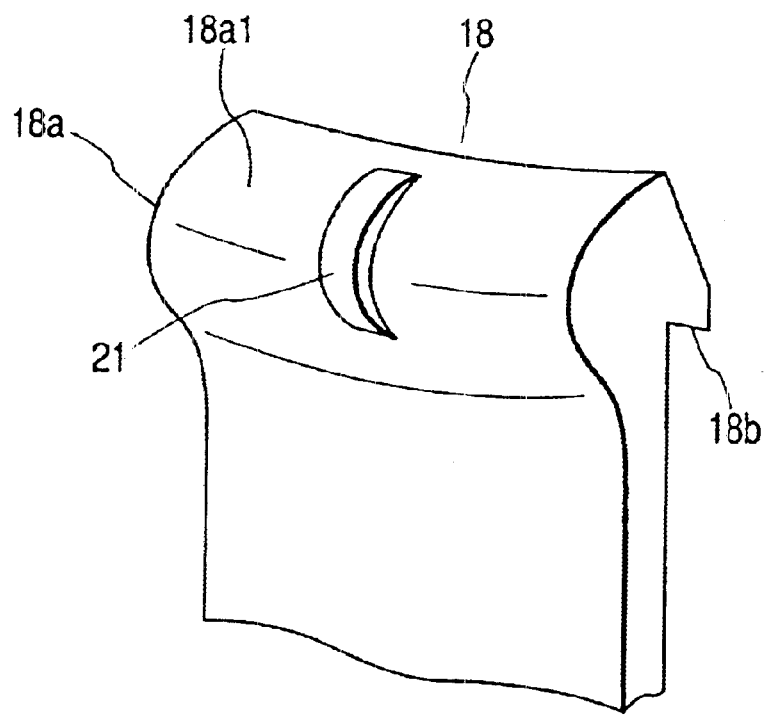
FIG. 1 is a perspective view illustrating a single mounting claw of a first embodiment of the invention.
Figure 2:
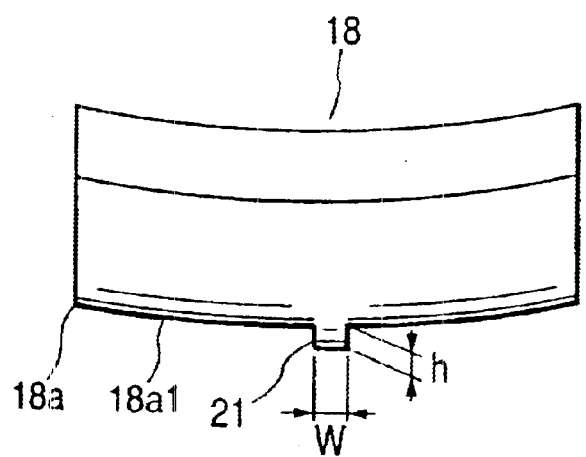
FIG. 2 is a rear view illustrating the single mounting claw.

Incidentally, FIGS. 1 and 2 show one of the mounting claws 18 as a typical one. In the mounting claw 18, a bulge part 18a is engaged with a concave part 16 formed in the disc wheel 11, and is shaped nearly like a curved semicircular pillar. A projecting part 21 is provided on an outer surface 18a1 of the bulge part 18a, which serves as an engaging surface of the mounting claw 18, in such a way as to be integral therewith. In this case, this projecting part 21 is constituted by a rib-like projection formed at the central portion of the outer surface 18a1 of the bulge part 18a in such a way as to extend in an axial direction (that is, an upward or downward direction, as viewed in FIG. 1). The width of this projection is set at 0.3 to 2 mm, and the height thereof is set at 0.2 to 1 mm. Incidentally, the dimensions of this bulge part 18a are set in such a way as to dependent on an elastic force of the wire ring 20 and the width of the mounting claw 18.

In the case of attaching the above-described wheel cover 12 to the disc wheel 11, the wheel cover 12 is first made to face the disc wheel 11. Then, the mounting claws 18 are pushed into and engaged with the concave part 16. At that time, the wire ring 20 restrains the mounting claws 18 from deforming in the radially inward direction, that is, a direction in which the mounting claws are engaged or disengaged. Consequently, the mounting claws 18 are firmly engaged with the concave part 16 of the disc wheel 11. Thus, the wheel cover 12 is attached to the disc wheel 11, so that the outer surface part of the disc wheel 11 is covered by the cover body 17.

As described above, the wire ring 20 restrains the mounting claws 18 from deforming in the radially inward direction, that is, a direction in which the mounting claws are engaged or disengaged, when the wheel cover 12 is attached to the disc wheel 11. However, at that time, a part of the wire ring 20, which is in contact with a corresponding one of the mounting claws 18, is pushed in the radially inward direction, as indicated by the arrow A shown in FIG. 4. Thus, all over this part is elastically deformed in such a way as to change the shape thereof from an arcuate one to a linear one.

Figure 5A:
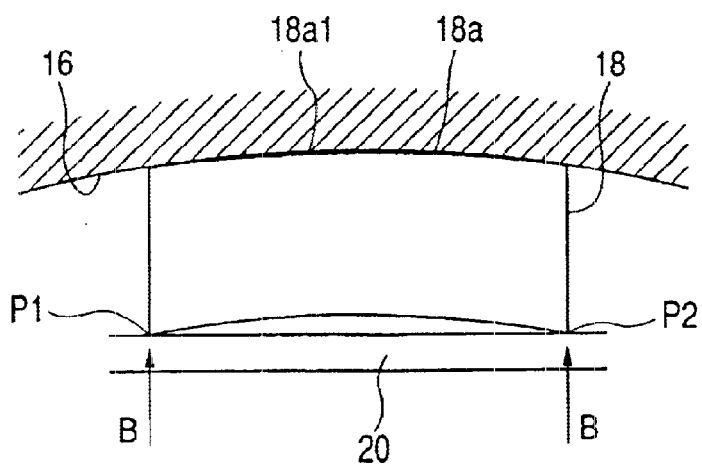
FIGS. 5A and 5B are longitudinal sectional rear views each illustrating a modification state of a mounting claw so as to describe an operation of the first embodiment.
Figure 5B:
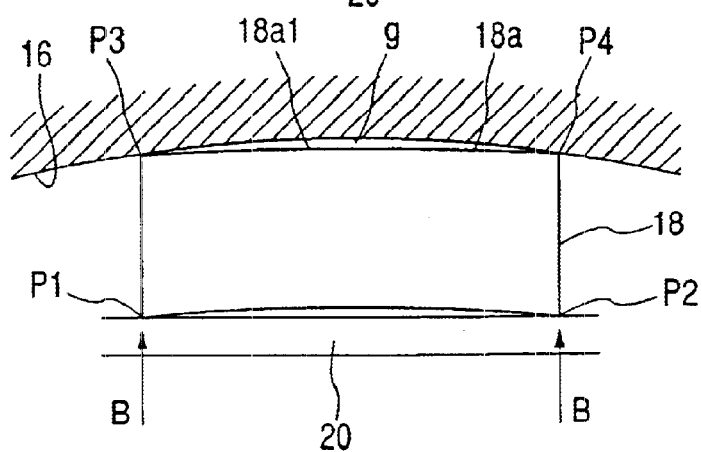

On the other hand, as illustrated in FIG. 5A, each of the mounting claws 18 is essentially formed in such a manner as to have a curved shape, which coincides with the annular concave part 16 formed in the disc wheel 11. Each of the mounting claws 18 receives a restoring elastic force of the wire ring 20, which is indicated by an arrow B, at two points P1 and P2 located at opposite inner sides thereof. Thus, the mounting claws 18 deform nearly like a straight line, as illustrated in FIG. 5B. Incidentally, in the case that the projection 21 is not provided on the outer surface 18a1 of the bulge part 18a, which serves as the engaging surface, the mounting claw 18 is in contact with the annular concave portion 16 only at two points P3 and P4 located at both outer sides thereof. Thus, a gap g is caused between the concave portion 16 and the central part of the mounting claw 18. The contact between the mounting claw 18 and the concave portion 16, which causes the gap g, does not generate a frictional force that is necessary for hindering rotation of the wheel cover 12.

Figure 6A:
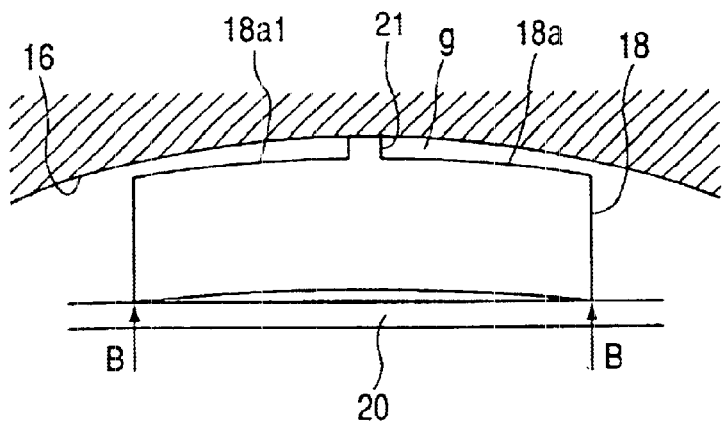
FIGS. 6A and 6B are longitudinal sectional rear views each illustrating a modification state of a projecting part of the mounting claw so as to describe an operation of the first embodiment.
Figure 6B:
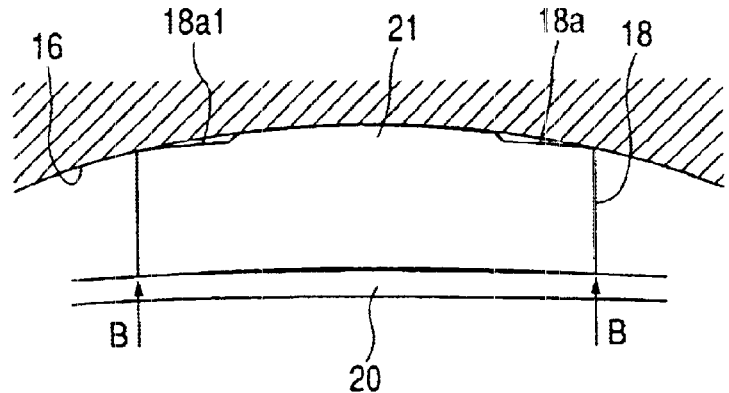

On the other hand, in the case of the wheel cover of this configuration in which the projecting part 21 is provided on the outer surface 18a1 of the bulge part 18a of the mounting claw 18, when the mounting claw 18 receives the restoring elastic force of the wire ring 20, which is indicated by the aforementioned arrow B, the projecting part 21 is crushed, that is, press-crushed, and fills the gap g to thereby increase the contact area between the mounting claw 18 and the concave portion 16, as illustrated in FIGS. 6A to 6B. Thus, the friction between the mounting claw 18 and the disc wheel 11 increases to thereby prevent rotation of the wheel cover 12.

Therefore, in the case of the wheel cover of this configuration, it is unnecessary to form a stopper in the disc wheel 11 as provided in the conventional wheel cover. Thus, the disc wheel 11 can be manufactured at low cost. Moreover, it is unnecessary to form a rib in the wheel cover 12 as provided in the conventional apparatus. The projecting part 21 to be provided on the mounting claw 18 instead of the rib can be formed without complicating the die for forming the cover body 17, differently from the die for forming the rib of the conventional apparatus. Consequently, the wheel cover 12 can be manufactured at low cost.

According to the wheel cover 12 configured only by forming the projecting part 21 on the mounting claw 18, the projecting part 21 cannot unbalance the mass distribution so highly as the stopper formed on the conventional disc wheel 6 and the rib formed on the conventional wheel cover 1 unbalance the mass distribution. Thus, the rotational balance of a rotating element composed of the disc wheel 11, the tire 14, and the wheel cover 12 can be enhanced.

In addition to the aforementioned embodiment, FIGS. 7 to 12 illustrate second to fourth embodiments of the invention, respectively. In these figures, like reference characters designate like components of the first embodiment. Thus, the description of such components is omitted. Hereinafter, only the difference between the first embodiment and each of the second to fourth embodiments is described.

Second Embodiment

Figure 7:
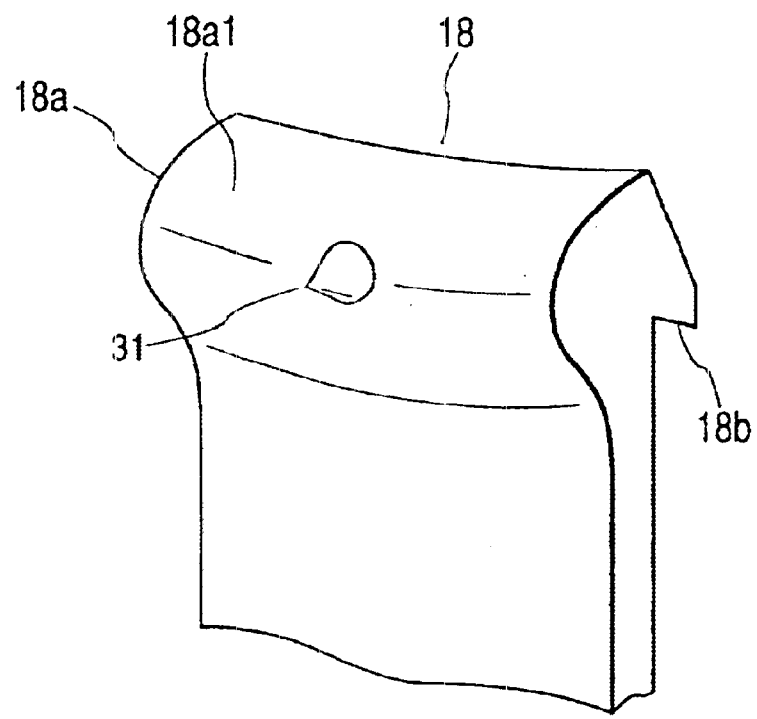
FIG. 7 is a view illustrating a second embodiment of the invention and corresponding to FIG. 1.
Figure 8:
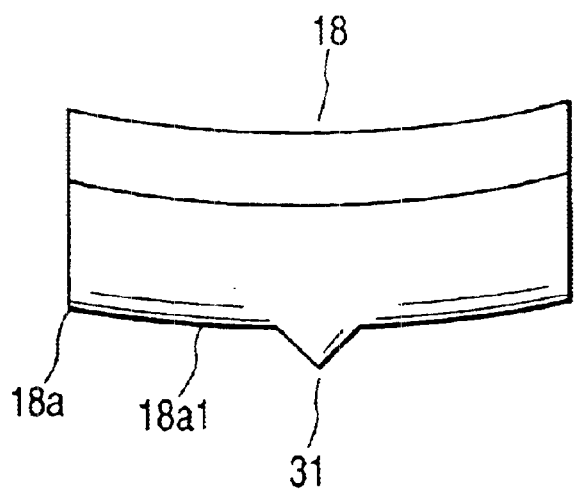
FIG. 8 is a view corresponding to FIG. 2.

In the second embodiment shown in FIGS. 7 and 8, a projecting part 31 is formed on an outer surface (that is, an engaging surface) 18a1 of a bulge part 18a of each mounting claw 18 provided in a wheel cover 12 by being constituted by a conical projection instead of the rib-like projection.

Similarly, in this embodiment, the projecting part 31 is press-crushed by a restoring elastic force of a wire ring 20. Thus, this embodiment can obtain operation and effects similar to those of the first embodiment. Further, in this case, the projecting part 31 is tapered. This facilitates the press-collapsing of the projecting part 31.

Third Embodiment

Figure 9:
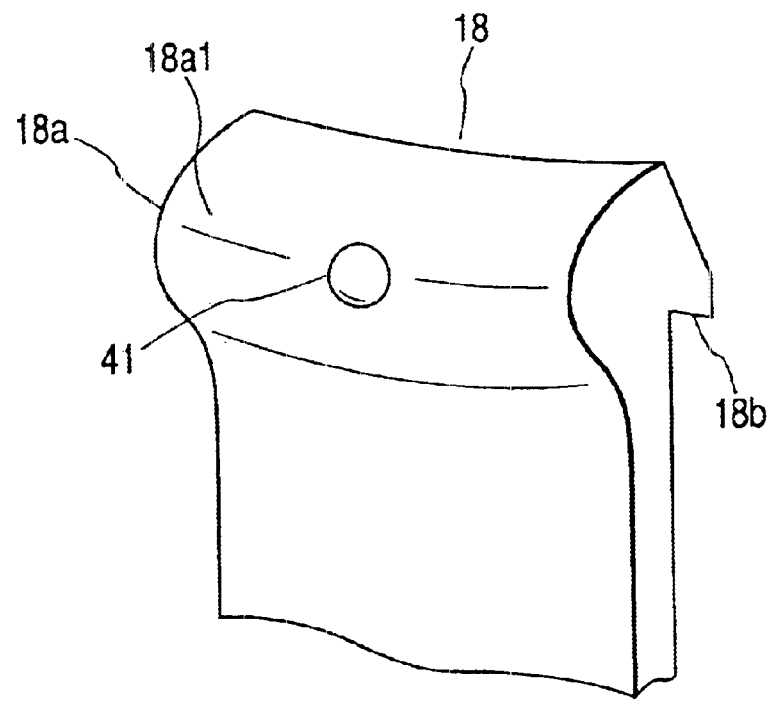
FIG. 9 is a view illustrating a third embodiment of the invention and corresponding to FIG. 1.
Figure 10:
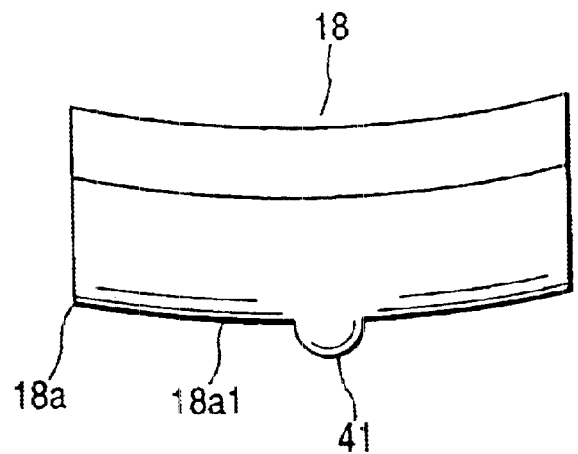
FIG. 10 is a view corresponding to FIG. 2.

In a third embodiment illustrated in FIGS. 9 and 10, a projecting part 41 is formed on an outer surface 18a1 of a bulge part 18a of each mounting claw 18 provided in a wheel cover 12 by being constituted by a semispherical projection instead of the aforementioned conical projection.

Similarly, in this embodiment, the projecting part 41 is press-crushed by a restoring elastic force of a wire ring 20. Thus, this embodiment can obtain operation and effects similar to those of the first embodiment.

Fourth Embodiment

Figure 11:
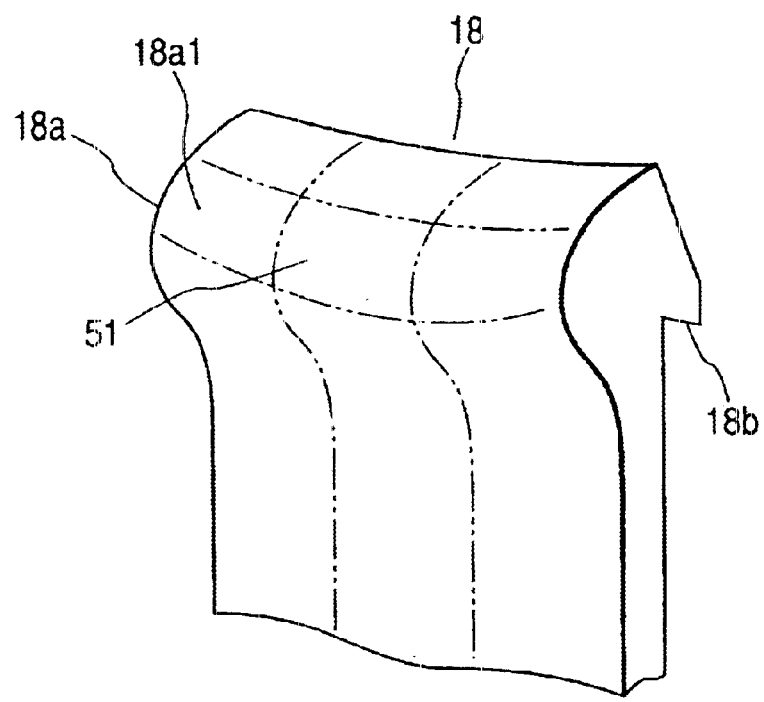
FIG. 11 is a view illustrating a fourth embodiment of the invention and corresponding to FIG. 1.
Figure 12:
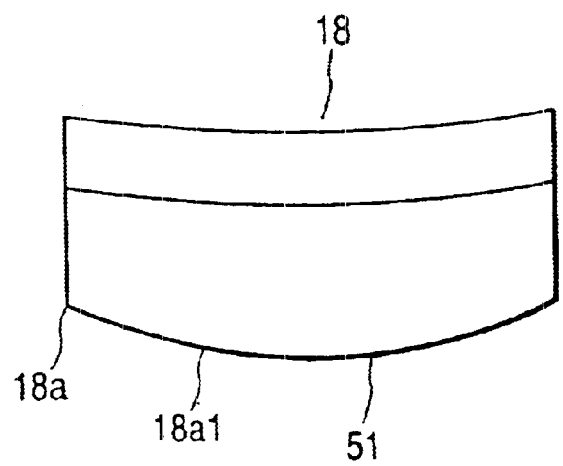
FIG. 12 is a view corresponding to FIG. 2.
Figure 13:
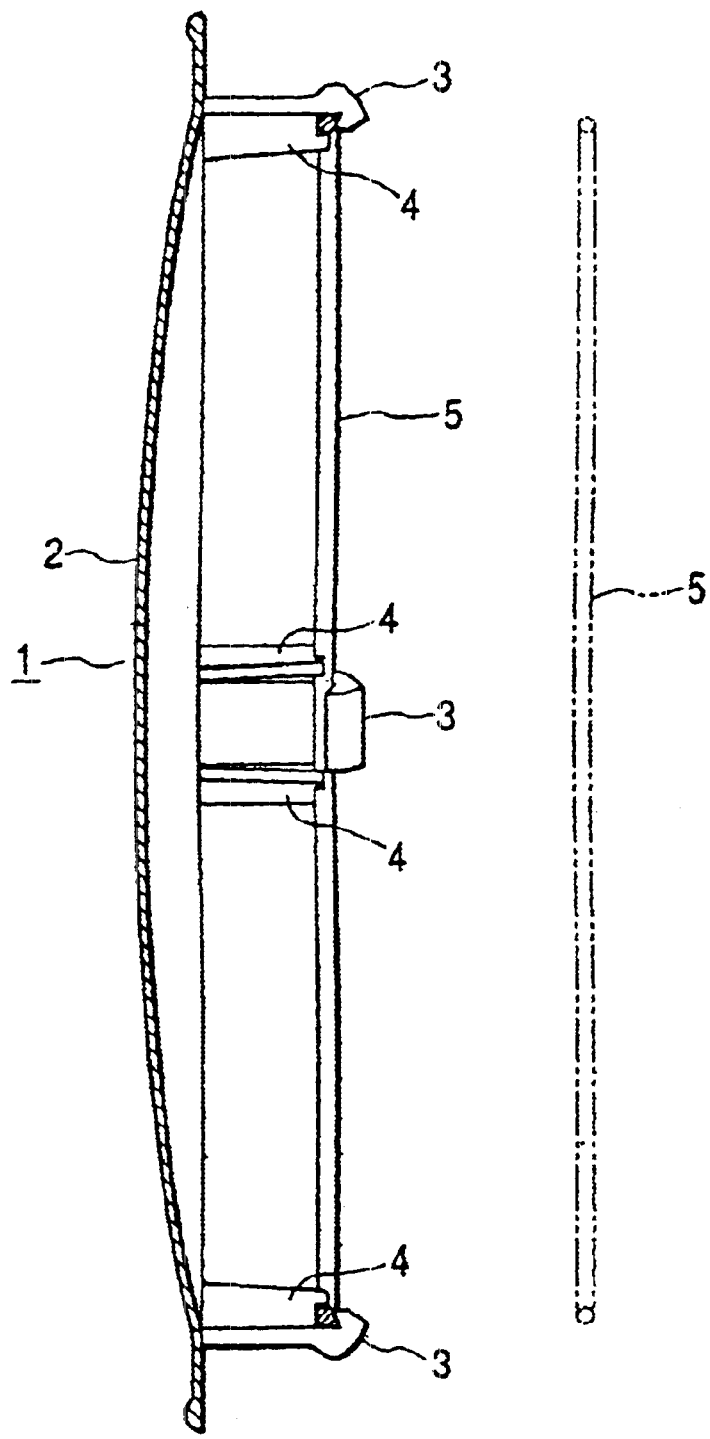
FIG. 13 is a longitudinally sectional view illustrating a conventional wheel cover.
Figure 14:
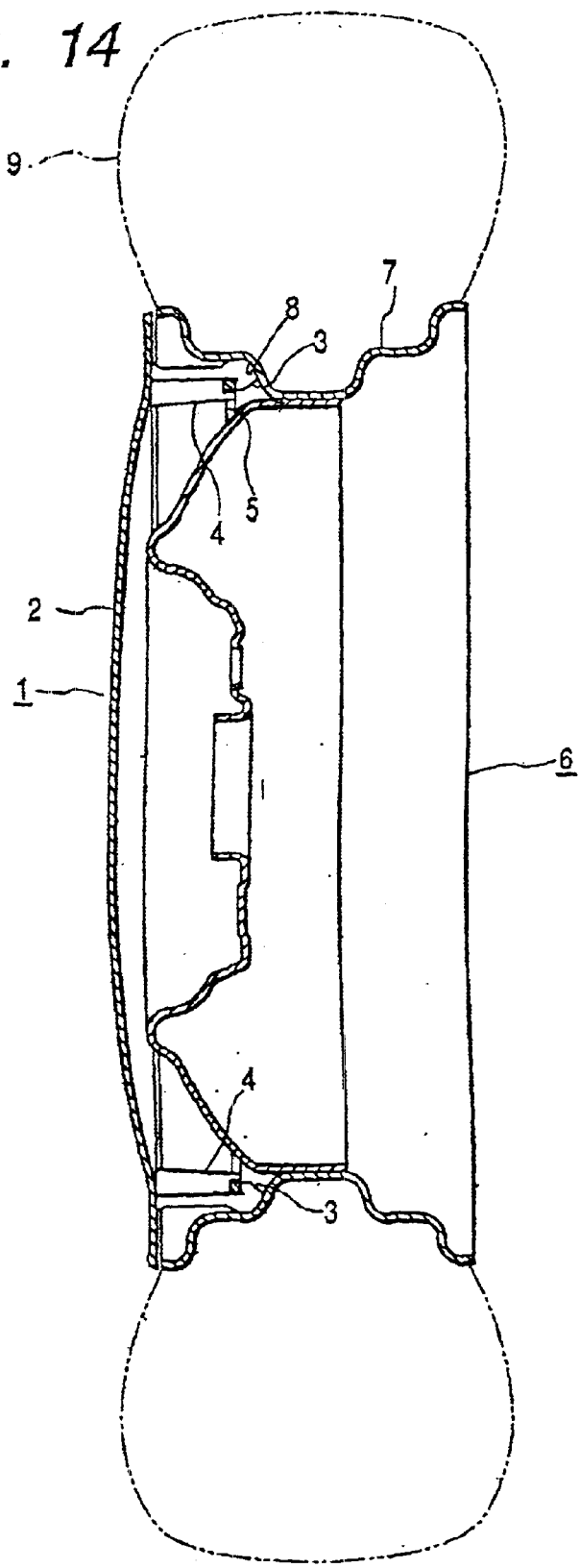
FIG. 14 is a view corresponding to FIG. 3.

In a fourth embodiment illustrated in FIGS. 11 and 12, a projecting part 51 is formed on an outer surface 18a1 of a bulge part 18a of each mounting claw 18 provided in a wheel cover 12 by being constituted by an uplift part to be provided so that a projecting height of a central portion thereof is more than a projecting height of each of opposite side end portions thereof, instead of the aforementioned semispherical projection.

The contact area between the concave portion 16 of the disc wheel 11 and each of the mounting claws 18 is increased by the entire surface of the projecting part 51 (that is, the uplift part). Further, the friction therebetween is increased. Thus, an operation of hindering rotation of the wheel cover 12 can be performed.

Additionally, the invention is not limited to the embodiments described hereinabove and illustrated in the drawings. Especially, a convex portion, which is the opposite of the concave portion 16, may be formed as the engaged part of the disc wheel 11. Accordingly, the engaging surface of each of the mounting claws 18 may be changed from the bulge part 18a to a depression part. In this depression part, the aforementioned kinds of projecting parts 21, 31, 41, and 51 may be provided. That is, the invention may be practiced by making suitable changes without departing from the gist thereof.

As described above, according to the wheel cover of the invention, a necessary operation of hindering rotation of the wheel cover is achieved by the projecting part, which is provided on the engaging surface of the mounting claw, without increasing the cost of the disc wheel and the wheel cover and without deteriorating the rotational balance.

What is claimed is:

1. A wheel cover comprising:

a synthetic resin cover body for covering an outer surface part of a vehicle disc wheel that includes an annular engaged part, the synthetic resin cover body configured to be attached to the vehicle disc wheel;

a plurality of mounting claws, each integrally formed on a rear surface of the cover body and engageable with the engaged part of the disc wheel for mounting the cover body onto the disc wheel;

a wire ring located inwardly in a radial direction of the mounting claws for restraining the mounting claws from deforming radially and inwardly; and a projecting part integrally formed on an engaging surface of the mounting claw so as to project therefrom toward the engaged part of the disc wheel when the cover body is mounted on the vehicle disc wheel, wherein the projecting part includes a central portion having a projecting height that is greater than the projecting height of each opposite side end portions of the engaging surface, each of which are in contact with the engaged part of the disc wheel when the cover body is attached to said disc wheel.

2. The wheel cover according to claim 1, wherein the projecting part is formed on a central part of the engaging surface of the mounting claw and is constituted by a projection to be press-crushed when the mounting claw is engaged with the engaged part of the disc wheel.

3. The wheel cover according to claim 1, wherein the projecting part is constituted by a head portion.

4. The wheel cover according claim 1, wherein a gap is formed between the engaging surface of the mounting claw and the engaged part of the disc wheel when the wheel cover is engaged with the vehicle disc wheel.

* * * * *